(12) United States Patent  
Ooshino et al.

(10) Patent No.: US 8,459,687 B2
(45) Date of Patent: Jun. 11, 2013

(54) AIR BAG MODULE

(75) Inventors: Masaki Ooshino, Yokohama (JP);
Masaru Narita, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/242,484

(22) Filed: Sep. 23, 2011

(65) Prior Publication Data
US 2012/0007347 A1  Jan. 12, 2012

Related U.S. Application Data

(63) Continuation of application No. 12/682,854, filed as application No. PCT/JP2008/068224 on Oct. 7, 2008, now Pat. No. 8,033,567.

(30) Foreign Application Priority Data

Oct. 15, 2007 (JP) ................................. 2007-268062

(51) Int. Cl.
*B60R 21/16* (2006.01)
(52) U.S. Cl.
USPC ....................................................... 280/728.2
(58) Field of Classification Search
USPC ........................................... 280/728.2, 728.1
See application file for complete search history.

(56) References Cited

U.S. PATENT DOCUMENTS

| 5,393,090 A | 2/1995 | Shepherd et al. |
| 5,513,876 A | 5/1996 | Matsumoto |
| 6,126,191 A | 10/2000 | Pepperine et al. |
| 7,758,064 B2 | 7/2010 | Onohara et al. |

FOREIGN PATENT DOCUMENTS

| DE | 195 05 307 | 8/1995 |
| JP | 6-156176 | 6/1994 |
| JP | 7-228212 | 8/1995 |
| JP | 8-282426 | 10/1996 |
| JP | 2001-18741 | 1/2001 |
| JP | 2003-165409 | 6/2003 |
| JP | 2007-062455 | 3/2007 |
| WO | WO 2009/051038 | 10/2008 |

OTHER PUBLICATIONS

International Search Report of PCT/JP2008/068224, Mailed Jan. 6, 2009, 3 pages.

*Primary Examiner* — Eric Culbreth
(74) *Attorney, Agent, or Firm* — Brinks Hofer Gilson & Lione

(57) ABSTRACT

An airbag module including an inflator, an air bag, and an air bag case. The air bag case houses the air bag and is attached to the inflator. The inflator supplies a gas to the air bag housed in the air bag case. The air bag case further includes an engagement member having an opening in a rectangular shape and hooks disposed on two opposing sides of thereof, and a lower surface plate member that is attached to the engagement member by a bridge member. The hooks are shaped to engage an instrument panel, thereby attaching the air bag case to the instrument panel. The air bag module may also include a fabric housing disposed around the air bag. The fabric housing has a box-like shape with a bottom portion, an open ceiling portion, and a connecting hole disposed in the bottom portion to receive the inflator.

17 Claims, 8 Drawing Sheets

Prior Art

Prior Art

AIR BAG MODULE

CROSS REFERENCE TO RELATED APPLICATIONS

This application is a continuation of U.S. patent application Ser. No. 12/682,854, which is a §371 national stage application of International Application No. PCT/JP2008/068224 filed on Oct. 7, 2008, now U.S. Pat. No. 8,033,567, the entire contents of which are hereby incorporated by reference.

TECHNICAL FIELD

The present invention relates to an air bag module disposed in an automobile.

BACKGROUND

Several safety devices are disposed in an automobile with the aim of securing occupant safety. For example, an air bag module for deploying an air bag, using gas generated by an inflator during an emergency, such as a collision, is one such safety device.

As shown in FIG. 7, a front passenger seat air bag module, which is one type of air bag module, is housed in an air bag case 2 such that a folded air bag 1 is covered by a strip-form flap 3. (See Japanese Patent Application Publication No. 2007-62455, for example.)

As shown in FIG. 8, this air bag module is attached by engaging a hook 2b, which is attached to the vicinity of an opening in one side wall 2a of the air bag case 2, with an engagement hole 4aa in an upright wall 4a provided on an inner side of an instrument panel 4. Note that a reference numeral 5 in FIG. 8 denotes an inflator.

Incidentally, in this air bag module, the entire periphery of the air bag is covered by a box-shaped metal or resin air bag case having an open ceiling surface in order to maintain the folded shape of the air bag during installation in a vehicle and restrict a deployment direction during deployment.

However, this air bag case is heavy, which runs counter to recent trends toward weight reduction. Further, the air bag case requires a large amount of resources, which runs counter to recent trends toward resource conservation. Moreover, the strength of an attachment portion of the air bag module must be increased in accordance with the increased weight of the air bag case.

A problem to be solved by the present invention is that when a conventional metal or resin box-shaped air bag case is employed, an increase in the amount of required resources and an increase in weight occur, and therefore resource saving and weight reduction cannot be achieved. Moreover, the strength of the attachment portion of the air bag module must be increased in accordance with the increase in weight.

DISCLOSURE OF THE INVENTION

The present invention has been designed from this viewpoint, and an object thereof is to solve the problems described above by forming a flap covering an air bag as a box having a bottom so that a folded shape of the air bag is maintained during installation in a vehicle and a deployment direction is restricted during deployment.

More specifically, an air bag module according to the present invention includes, as a main feature:

an inflator and an air bag;

an air bag case configured to house the air bag and attach the inflator, which supplies a gas to the housed air bag; and a fabric housing that holds the air bag when the air bag is housed in the air bag case, wherein the fabric housing is formed as a box having a bottom, an open ceiling, and a connecting hole that communicates with the inflator in a floor surface thereof, with the fabric housing being formed from a fabric having a strength that is greater than or equal to a strength of a cushion of the air bag, and wherein the air bag case comprises an engagement member having an opening for inserting the fabric housing and a hook disposed on two opposing sides of the opening, the engagement member being configured to attach the air bag case to an instrument panel, and a lower surface plate member that is fastened to the engagement member via a bridge member.

In the present invention, the fabric housing is formed as a box having a bottom and an open ceiling. The fabric housing is formed from a fabric having a strength that is equal to or greater than the strength of a cushion used as the air bag, and therefore the fabric housing can be made to function as an air bag case.

Moreover, with the configuration described above, the air bag case can be formed from only the engagement member, which includes only the hooks on the two opposing sides of the opening, and the lower surface plate member, and which is fastened to the engagement member via the bridge member. Therefore, the side walls can be eliminated to a maximum extent, which enables reductions in resources used to create the air bag device and in weight.

In the present invention, the bridge member latches the engagement member and the lower surface plate member to each other in a bridging manner. The bridge member is formed such that the engagement member and the lower surface plate member serve as a frame for holding the fabric housing.

Examples of the bridge member are as follows.

(a) The bridge member is formed by engaging plate-form members extending from the engagement member or the lower surface plate member in a thickness direction of the folded air bag to each other in an intermediate site of the air bag thickness direction.

(b) The bridge member is formed by engaging a third plate-form member provided separately to the engagement member and the lower surface plate member to both the engagement member and the lower surface plate member.

(c) The bridge member is extended from one of the engagement member and the lower surface plate member toward the other in the thickness direction of the folded air bag such that the engagement member and the lower surface plate member are engaged.

In the present invention, when the engagement member and the lower surface plate member are formed as separate members, the air bag case can be attached to a different vehicle simply by modifying either one of the members. When the thickness of the lower surface plate member, which does not pose a problem in terms of strength, is reduced below the thickness of the engagement member at this time, a further reduction in weight is achieved.

Further, in the present invention, when an upright wall is provided around a periphery of the opening in the engagement member, the rigidity of the engagement member can be increased and the deployment direction of the air bag during deployment can be restricted more reliably. By providing a relief portion in a location serving as a corner portion of the upright wall at this time, distortion that occurs during processing when the upright wall is press-molded or drawn can be dispersed.

Further, when a bead is formed in at least a planar part of the hook provided on the engagement member and the planar part is level with the opening with the bead extending over an entire lengthwise direction length of the hook, the rigidity of the hook portion is increased. This leads to an increase in the strength of the attachment portion for attaching the air bag case to an instrument panel.

In the present invention, the fabric housing for holding the air bag maintains the folded shape of the air bag during installation in a vehicle and restricts the deployment direction during deployment, and therefore side walls of the air bag case can be eliminated to a maximum extent. As a result, reductions in resources and weight can be achieved.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 3 (*b*) is a view illustrating an upright wall shown in FIG. 3 (*a*) and a relief portion provided in a corner portion thereof;

FIGS. 3 (*c*) to 3 (*e*) are, respectively, a perspective view, a front view, and a side view illustrating a bead provided on a hook;

DETAILED DESCRIPTION

Conventional metal or resin box-shaped air bag cases require an increased amount of resources and weight, and therefore resource saving and weight reduction cannot be achieved. Moreover, an attachment portion of the air bag module must be increased in strength in accordance with the increase in weight.

The present invention realizes reductions in resources and weight by forming a flap covering an air bag as a box having a bottom, thereby eliminating side walls of the air bag case to a maximum extent while ensuring that a folded shape of the air bag is maintained during installation in a vehicle and restricting a deployment direction during deployment.

Example

The preferred embodiment of the present invention will be described below using FIGS. 1 to 6.

Figure 1:
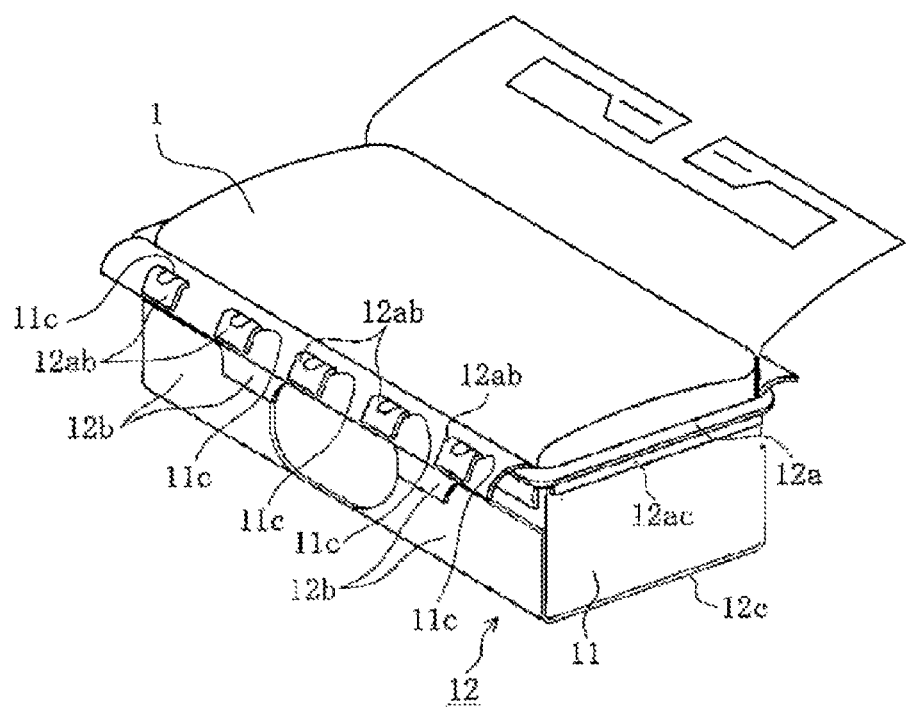
FIG. 1 is a perspective view illustrating an example of an air bag module according to the present invention, which is provided in a front passenger seat, in an assembled state.
Figure 2:
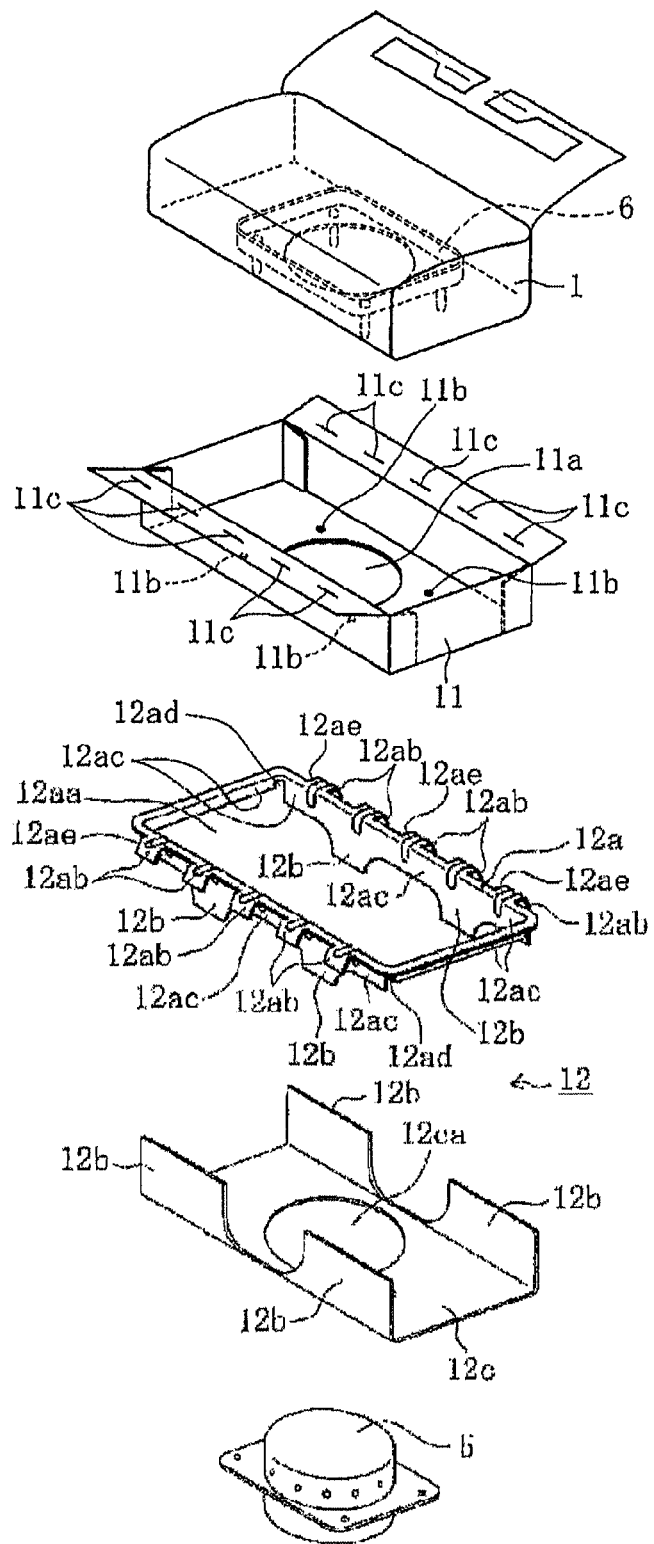
FIG. 2 is an exploded perspective view of FIG. 1.
Figure 3:
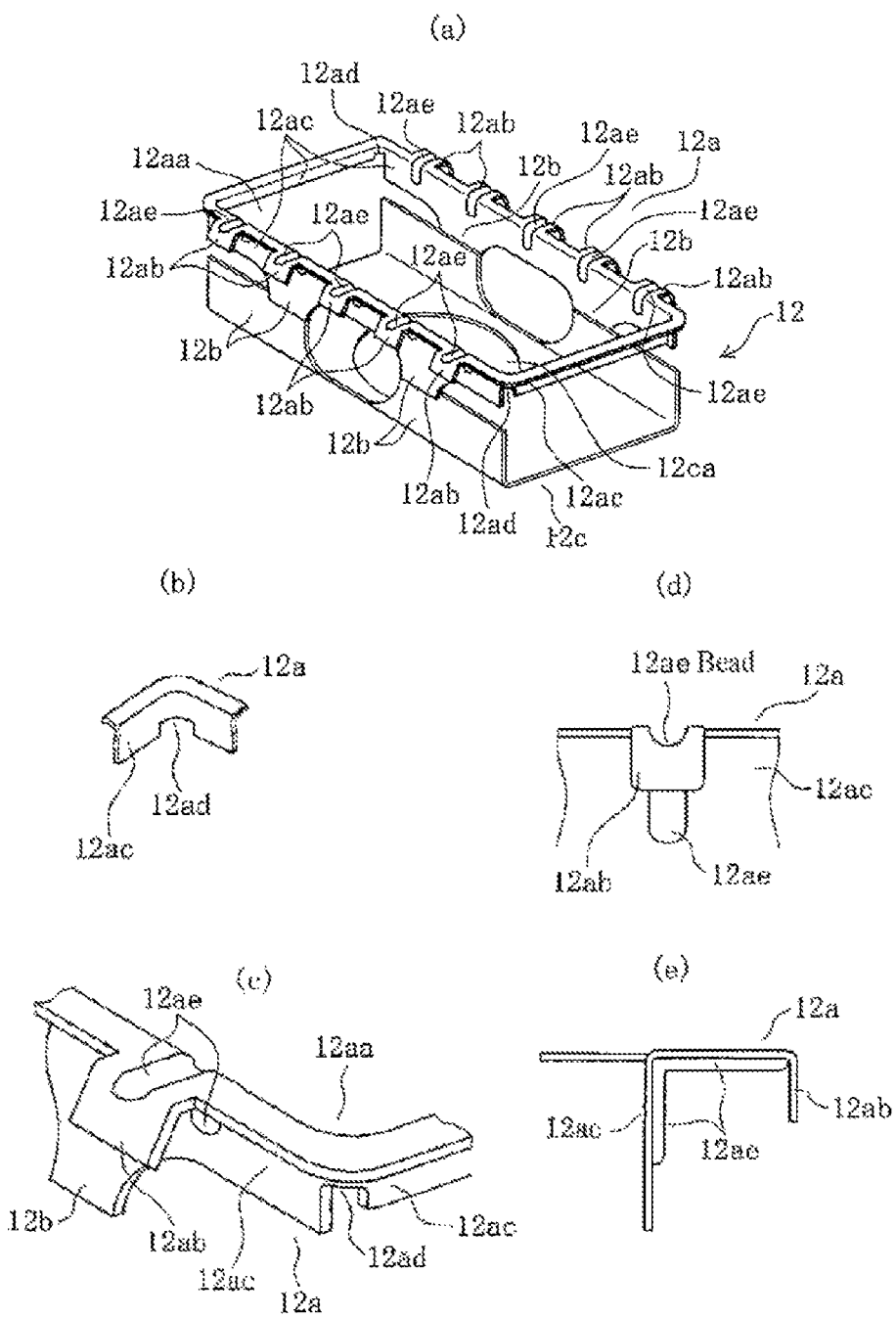
FIG. 3(*a*) is a perspective view showing the air bag case of FIG. 1.
Figure 4:
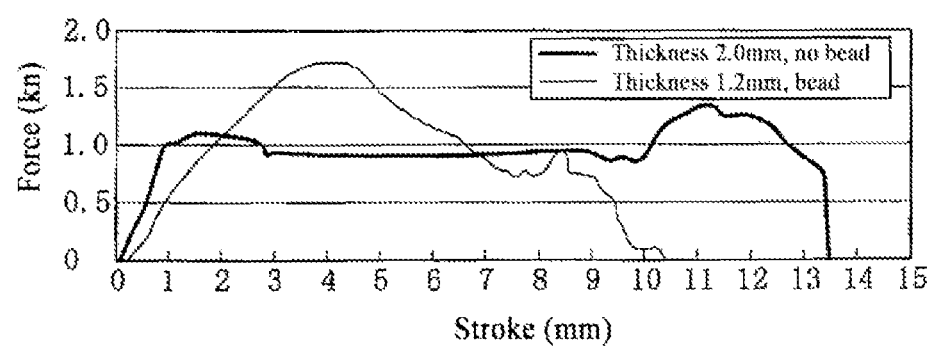
FIG. 4 is a view showing a result of a tensile test performed on the hook of the air bag case shown in FIG. 3.
Figure 5:
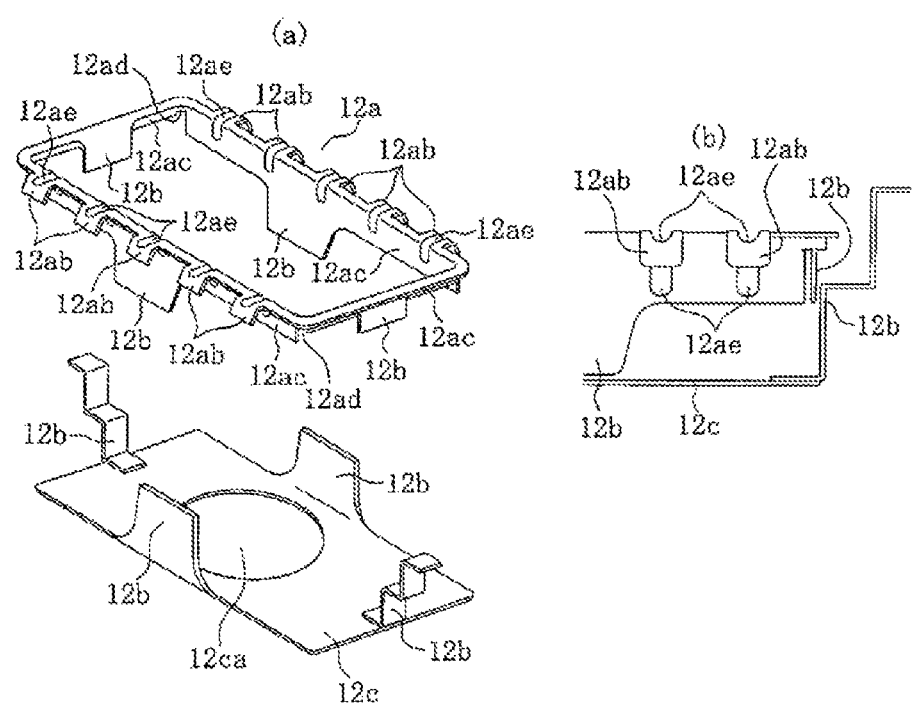
FIG. 5 (*a*) is an exploded perspective view showing another example of an air bag case, and FIG. 5 (*b*) is a side view showing an engagement portion disposed between an engagement member and a lower surface plate member.
Figure 6:
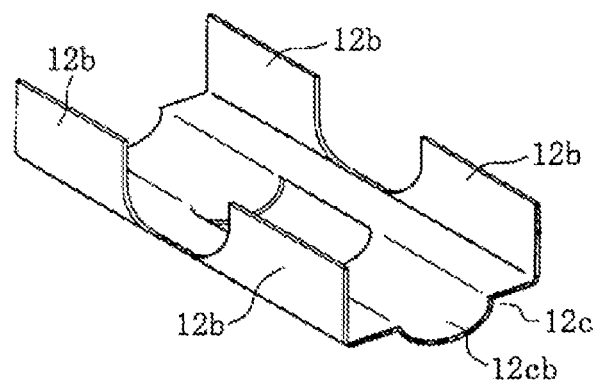
FIG. 6 is a view illustrating another example of a lower surface plate member of the air bag case.
Figure 7:
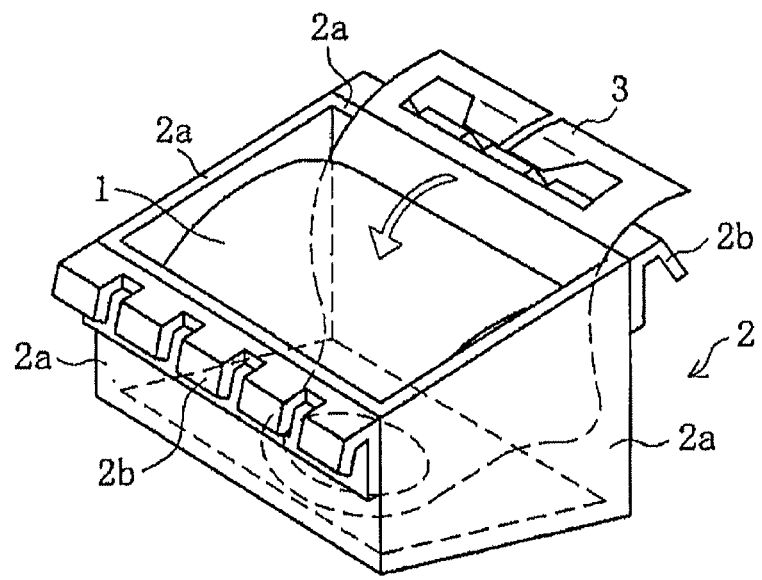
FIG. 7 is a perspective view of a conventional air bag module housed in an air bag case and covered by a flap.
Figure 8:
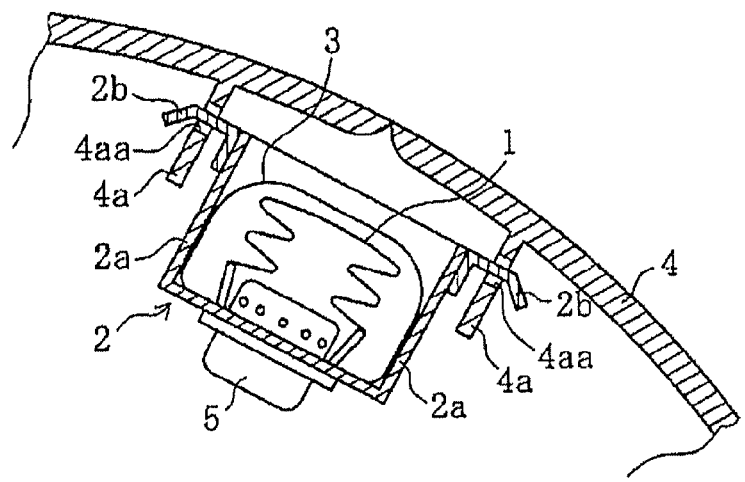
FIG. 8 is a view illustrating a state in which the conventional air bag module is attached to an instrument panel.

FIG. 1 is a view illustrating an example of an air bag module according to the present invention, which is provided in a front passenger seat, in an assembled state. FIG. 2 is an exploded perspective view of FIG. 1. FIG. 3 is a view illustrating an air bag case of FIG. 1. FIG. 4 is a view showing a result of a tensile test performed on a hook of the air bag case shown in FIG. 3. FIG. 5 is a view showing another example of an air bag case. FIG. 6 is a view illustrating another example of a lower surface plate member of the air bag case.

A reference numeral 11 denotes a fabric housing that holds an air bag 1 when the air bag 1 is housed in an air bag case 12. In the present invention, the fabric housing 11 is manufactured by sewing a box having a bottom and an open ceiling and having a substantially identical shape to the air bag 1 using, for example, a fabric that is identical to that of the air bag 1, such that the air bag 1 can be housed therein when folded.

A connecting hole 11*a* that communicates with an inflator 5 and an attachment hole 11*b* are provided on a floor surface of the fabric housing 11. Further, in the example shown in FIGS. 1 to 3, notches 11*c* that engage with hooks 12*ab* of the air bag case 12, which are described below, are provided in the two opposing sides of the aforementioned opening.

In the air bag module according to the present invention including the fabric housing 11 described above, a floor surface and all side faces of the air bag 1 are covered by the fabric housing 11.

Hence, when the air bag 1 is incorporated into the air bag case 12, the air bag 1 can be protected from abrasion against the air bag case 12. Further, during installation in a vehicle, the air bag 1 can be maintained in a folded state by the fabric housing 11.

Meanwhile, during deployment of the air bag 1, the fabric housing 11 holds the air bag 1 in the interior of the air bag case 12 while a bridge member 12*b*, an engagement member 12*a*, and a lower surface plate member 12*c* suppress elastic deformation of the fabric housing 11. Hence, a sufficient deployment performance for restraining an occupant can be secured in the air bag 1 while correctly restricting the deployment direction of the air bag 1.

In the present invention, side walls of the air bag case 12 can be eliminated to a maximum extent by employing the fabric housing 11.

Therefore, the amount of resources required to manufacture the air bag case 12 can be reduced, which also enables a reduction in the weight of the air bag case 12. In an example of the present invention, the weight was reduced by approximately 200 g.

More specifically, in the present invention, the air bag case 12 can be formed from only the engagement member 12*a*, which includes engagement hooks 12*ab* on two opposing sides of an opening 12*aa*, and the lower surface plate member 12*c*, which is fastened to the engagement member 12*a* via the bridge member 12*b*.

In FIGS. 1 to 3, the engagement member 12*a* and the lower surface plate member 12*c* are formed as separate members, and two bridge members 12*b* are formed integrally with the surface plate member 12*c* on each of the two side faces opposing the engagement member 12*a*. By forming the engagement member 12*a* and the lower surface plate member 12*c* from separate members in this manner, the air bag case 12 can be attached to a different vehicle simply by modifying either one of the members.

The lower surface plate member 12*c*, which serves merely to hold the inflator 5, may be reduced in thickness as long as the required strength is obtained, and can therefore be made thinner than the engagement member 12*a*, leading to a further reduction in weight. Note that in the case where the bridge members 12b are formed as separate members, the bridge members 12b may be fastened to each other by welding, bolts, and so on.

Further, in the example shown in FIGS. 1 to 3, the rigidity of the engagement member 12a is increased by press-molding an upright wall 12ac around the entire periphery of the opening 12aa in the engagement member 12a, and as a result, the deployment direction of the air bag 1 during deployment can be restricted more reliably. At this time, a relief portion 12ad is provided in locations serving as corner portions of the upright wall 12ac to disperse distortion that occurs when the upright wall 12ac is press-molded or drawn during manufacturing.

Further, a bead 12ae that increases the rigidity of the hooks 12ab and increases the strength of the attachment portion, which serves to attach the air bag case 12 to the instrument panel, is formed along an entire lengthwise direction length of a planar part of the hook 12ab, which is level with the opening 12aa and a part of the upright wall 12ac from which the hook 12ab projects.

When the bead 12ae shown in FIGS. 3(a), 3(c), 3(d) and 3(e) is formed in the hook 12ab part in the upright wall 12ac part, a geometrical moment of inertia of at least 10 mm$^4$, which corresponds to a thickness of 2.0 mm, can be obtained even at a thickness of 1.2 mm, as shown in FIG. 4.

Hence, by forming the bead 12ae on the hook 12ab part and the upright wall 12ac part in this manner, the thickness of the engagement member 12a can be reduced while maintaining the required strength, thereby enabling a further reduction in weight.

A reference numeral 12ca in FIGS. 1 to 3 denotes a fitting hole provided in the lower surface plate member 12c for fitting the inflator 5, while a reference numeral 6 in FIG. 2 denotes a retainer ring for fixing the air bag 1 and the inflator 5 to the air bag case 12.

With the air bag module according to the present invention having the configuration described above, the folded shape of the air bag 1 can be maintained during installation in a vehicle by the fabric housing 11 formed as a box having a bottom. Moreover, when the air bag 1 is deployed during an emergency, the deployment direction can be restricted.

In addition, by employing the fabric housing 11 having the configuration described above, the side walls of the air bag case 12 can be eliminated to a maximum extent, thereby enabling reductions in resources and weight.

The air bag module according to the present invention is of course not limited to the above example.

As shown in FIG. 5, the bridge member 12b of the air bag case 12 may be attached to each of the opposing side faces, and the bridge members 12b disposed on one set of opposing side faces may project in the direction of the engagement member 12a and may be attached directly to the instrument panel.

When the bridge member 12b projects in the direction of the engagement member 12a and is attached directly to the instrument panel in this manner, distortion of the instrument panel during deployment of the air bag 1 can be suppressed.

The present invention is not limited to the example described above, and may be subjected to appropriate modifications within the scope of the technical spirit of the claims.

In other words, the air bag module described above is a preferred example of the present invention, and other embodiments may be implemented or executed using various methods. Unless specific limiting description is provided in the specification of this application, the present invention is not limited to the specific shapes, sizes, configurations, arrangements, and so on of the components illustrated in the attached drawings.

Further, the expressions and terminology used in the specification of this application are provided for descriptive purposes, and unless specific limiting description is provided, the present invention is not limited to these expressions and terminology.

For example, the engagement member 12a, bridge member 12b, and lower surface plate member 12c may be formed integrally. Alternatively, the bridge member 12b may be formed integrally with either the engagement member 12a or the lower surface plate member 12c.

Further, the inflator 5 is not limited to a disc-shaped inflator, and a columnar inflator may be used instead. When a columnar inflator is used, the lower surface plate member 12ca is provided with a columnar recessed portion 12cb such as that shown in FIG. 6.

Furthermore, when a bottom portion of the air bag 1 is sewn integrally with the floor surface of the fabric housing 11, the strength of a bottom surface part of the air bag 1 is increased.

When an approximately identical strength is adequate, a piece of fabric constituting the bottom surface of the air bag 1 may be omitted.

Furthermore, the bead 12ae may be formed only along the entire lengthwise direction length of the planar part of the hook 12ab that is level with the opening 12aa and omitted from the part of the upright wall 12ac from which the hook 12ab projects.

The air bag module according to the present invention described above is disposed in an automobile for use, but exhibits similar effects when provided in a vehicle other than an automobile, such as an airplane or a ship.

We claim:

1. An air bag module, comprising:
an inflator;
an air bag;
an air bag case configured to house said air bag, said air bag case being attached to said inflator, said inflator supplying a gas to said air bag housed in said air bag case,
wherein said air bag case comprises an engagement member having an opening in the shape of a rectangle and hooks disposed on two opposing sides of said opening, and a lower surface plate member that is attached to said engagement member by a bridge member, said bridge member being unitarily formed with said lower surface plate member, wherein said hooks are shaped to engage an instrument panel, thereby attaching said air bag case to said instrument panel, a bead disposed on at least a planar part of each of said hooks of said engagement member, said planar part being substantially level with said opening, said bead extending over substantially an entire length of each of said hooks in a lengthwise direction.

2. The air bag module according to claim 1, wherein said engagement member and said lower surface plate member are formed as separate members.

3. The air bag module according to claim 2, wherein a thickness of said lower surface plate member is thinner than a thickness of said engagement member.

4. The air bag module according to claim 1, wherein an upright wall is provided around a periphery of said opening of said engagement member.

5. The air bag module according to claim 4, wherein a corner portion of said upright wall comprises a relief portion disposed therein.

6. The air bag module according to claim 1, further comprising:
a fabric housing disposed around said air bag housed in said air bag case, said fabric housing having a box-like shape with a bottom portion, an open ceiling portion, and a connecting hole disposed in said bottom portion, said connecting hole being in communication with said inflator, wherein said fabric housing is formed from a fabric having a strength that is greater than or equal to a strength of a fabric of a cushion portion of said air bag.

7. An air bag module, comprising:
an inflator;
an air bag;
an air bag case configured to house said air bag, said air bag case being attached to said inflator, said inflator supplying a gas to said air bag housed in said air bag case, wherein said air bag case further comprises
an engagement member having a flange defining an opening in the shape of a rectangle, and an upright wall provided on all sides of the periphery of said opening, and a hook disposed on two opposing sides of said opening, said hooks having a planar part that is transverse to the upright wall and substantially level with the opening, and
a lower surface plate member attached to said engagement member by a bridge member, wherein said hooks are shaped to engage an instrument panel, thereby attaching said air bag case to said instrument panel.

8. The air bag module according to claim 7, wherein said engagement member and said lower surface plate member are formed as separate members.

9. The air bag module according to claim 7, wherein said bridge member is unitarily formed with said lower surface plate member.

10. The air bag module according to claim 7, wherein said bridge member is attached to one of said upright walls.

11. The air bag module according to claim 7, wherein said engagement member is attached to said lower surface plate member by bridge members provided on two opposing sides of said lower surface plate member.

12. The air bag module according to claim 7, wherein a thickness of said lower surface plate member is thinner than a thickness of said engagement member.

13. The air bag module according to claim 7, wherein a corner portion of said upright wall comprises a relief portion disposed therein.

14. The air bag module according to claim 7, further comprising a bead disposed on at least a planar part of said hooks of said engagement member, said planar part being substantially level with said opening, said bead extending over substantially an entire length of said planar part of said hooks in a lengthwise direction.

15. The air bag module according to claim 7, further comprising a bead disposed on at least the planar part of said hooks of said engagement member and at least a part of said upright wall, said bead extending over substantially an entire length of said hooks in a lengthwise direction.

16. The air bag module according to claim 7, further comprising a fabric housing disposed around said air bag and located between said air bag and said air bag case, said fabric housing having a box-like shape with a bottom portion, an open ceiling portion, and a connecting hole disposed in said bottom portion, said connecting hole being in communication with said inflator, wherein said fabric housing is formed from a fabric having a strength that is greater than or equal to a strength of a fabric of a cushion portion of said air bag.

17. The air bag module according to claim 7, wherein said hooks engage with portions of a fabric housing disposed around said air bag and located between said air bag and said air bag case.

* * * * *